United States Patent
Goossen et al.

(10) Patent No.: US 7,912,596 B2
(45) Date of Patent: Mar. 22, 2011

(54) VEHICLE TRAJECTORY VISUALIZATION SYSTEM

(75) Inventors: Katherine Goossen, Albuquerque, NM (US); Maurizio Leo, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 951 days.

(21) Appl. No.: 11/755,363

(22) Filed: May 30, 2007

(65) Prior Publication Data

US 2008/0300745 A1    Dec. 4, 2008

(51) Int. Cl.
   *G05D 1/00* (2006.01)
   *G01S 21/32* (2006.01)
(52) U.S. Cl. ............... 701/25; 701/3; 701/211; 340/995
(58) Field of Classification Search .............. 701/25, 701/3, 4, 211; 715/805, 855; 340/995
   See application file for complete search history.

(56) References Cited

U.S. PATENT DOCUMENTS

| | | | |
|---|---|---|---|
| 5,904,724 A * | 5/1999 | Margolin | 701/120 |
| 6,522,958 B1 * | 2/2003 | Dwyer et al. | 701/3 |
| 6,571,155 B2 | 5/2003 | Carriker et al. | |
| 7,107,148 B1 | 9/2006 | Bodin et al. | |
| 7,154,496 B1 | 12/2006 | Engel et al. | |
| 7,228,232 B2 * | 6/2007 | Bodin et al. | 701/301 |
| 7,248,949 B2 * | 7/2007 | Love et al. | 701/4 |
| 7,693,621 B1 * | 4/2010 | Chamas | 701/16 |
| 2001/0005810 A1 * | 6/2001 | Senda et al. | 701/211 |
| 2002/0140810 A1 * | 10/2002 | Winikka | 348/117 |
| 2005/0192717 A1 | 9/2005 | Tafs et al. | |
| 2007/0260364 A1 * | 11/2007 | Dwyer | 701/3 |
| 2009/0012660 A1 * | 1/2009 | Roberts et al. | 701/3 |

* cited by examiner

*Primary Examiner* — Tan Q Nguyen
(74) *Attorney, Agent, or Firm* — Fogg & Powers LLC

(57) ABSTRACT

A vehicle trajectory visualization system capable of displaying real-time (or recorded) vehicle orientation, position, velocity, and waypoint data using a 3D rendering system. The aforementioned data is transmitted from the vehicle to a base station that processes and manipulates the data prior to 3D rendering and insertion into a database. Due to the storing of the vehicle trajectory data, playback of past trajectories is possible, enabling enhanced visual After-Action Review. This system provides instant visual inspection of any virtual or real vehicle's planned trajectory and waypoints versus actual traveled trajectory.

20 Claims, 5 Drawing Sheets

VEHICLE TRAJECTORY VISUALIZATION SYSTEM

BACKGROUND OF THE INVENTION

In the process of watching the planned operations of a vehicle (e.g. unmanned) as it flies, drives, burrows, floats, or maneuvers through a medium, it is difficult to ensure the vehicle remains on the planned path and sequences the waypoints correctly. Without a visualization system to view the planned versus actual trajectory, waypoints and other information regarding vehicle operations, one cannot accurately determine whether the vehicle meets the desired requirements. As the vehicle travels out of sight, it becomes more difficult to evaluate the desired vehicle travel trajectory effectiveness (waypoint time of arrival, deviations from plan, etc.). Vehicle waypoints are difficult for people to visualize, as are vehicle trajectories.

Therefore, there exists a need for a visualization system that tracks vehicle position, orientation, and velocity, shows planned versus actual trajectory, visualizes waypoints and waypoint sequencing, etc. with real-time and playback capability, thus allowing developers and trainers alike to perform After-Action Review (AAR), train in vehicle usage, track trajectory, and determine if requirements are met.

SUMMARY OF THE INVENTION

The present invention visually provides real-time vehicle trajectory information. It also provides a display of the vehicle planned travel trajectory with waypoints, After-Action Review of planned versus actual vehicle trajectory by visually inspecting historical missions, and the ability to replay logged vehicle telemetry and missions.

In one aspect of the present invention, the system provides for visualizing vehicle current and historical position, orientation, and velocity using real-time transmission of data from a vehicle.

In another aspect of the present invention, a 3D rendering system is provided for comparing planned versus actual vehicle trajectories.

In still another aspect of the present invention, data received from the vehicle is logged in a database for replay in the 3D rendering system.

In yet another aspect of the present invention, a visualization of the vehicle track is generated by a real-time virtual simulation.

Other objects, advantages and novel features, and further scope of applicability of the present invention will be set forth in part in the detailed description to follow. The objects and advantages of the invention may be realized and attained by means of the instrumentalities and combinations particularly pointed out in the appended claims.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Aspects of the present invention provide systems and methods for displaying real-time vehicle orientation, position, and velocity information, as well as planned waypoint markers and past trajectory information.

Although the following disclosure will make reference to specific wireless transmission protocols and rates, 3D rendering system details, and database operation information, other comparable data communication methods and systems may be used. Particular configurations and protocols discussed in examples can be varied and are merely cited to illustrate an embodiment of the present invention and are not intended to limit the scope of the invention.

Figure 1:
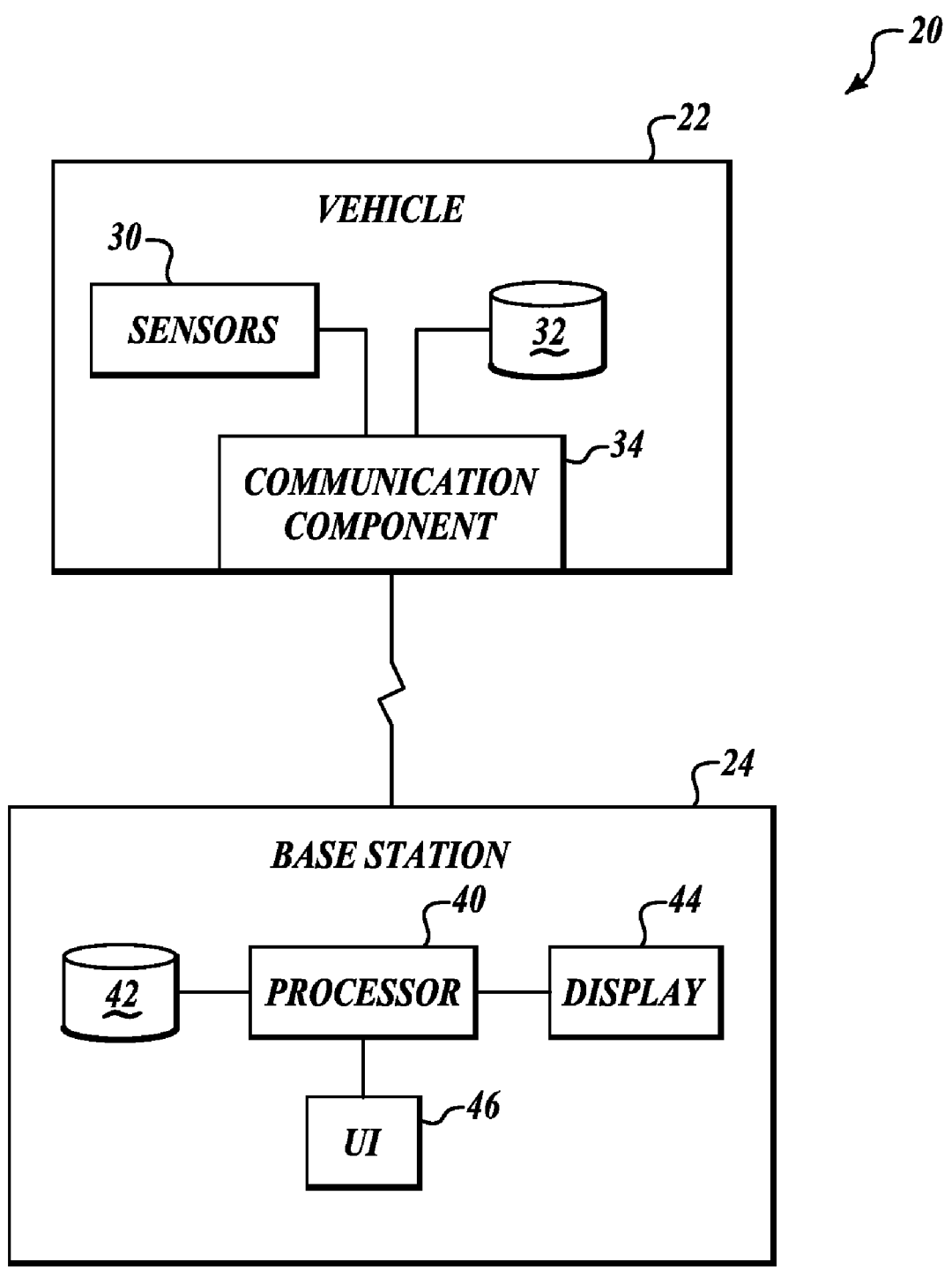
FIG. 1 is a schematic diagram of an example system formed in accordance with the present invention.

FIG. 1 shows a vehicle trajectory visualization system 20 that performs real-time monitoring and presentation of a vehicle's trajectory and evaluation of its waypoint sequencing correctness. The system 20 includes a vehicle 22 in signal communication with the base station 24. The vehicle 22 includes sensors 30 and a database 32. The base station 24 includes a processor 40 in signal communication with a database 42, a display 44 and a user interface (UI) 46. The base station 24 outputs a three-dimensional (3-D) presentation of vehicle operation on the display 44 based on information stored in the database 32 and generated by the sensors 30.

The sensors 30 output sensed orientation, position, and velocity information. The database 32 includes previously stored waypoint data (3-D data). The vehicle 22 includes a communication component 34 that packages and sends the waypoint data and the sensor information to the base station 24 at a predetermined transmission rate (i.e. 30 Hz) using a predefined wireless communication protocol, such as IEEE#802.11b. The processor 40 applies various coordinate transformation calculations to prepare the received data for 3-D rendering and display on the display 44. For example, the processor 40 receives universal transverse mercator (UTM), geodetic, etc., coordinates and transforms them into a 3-D rendering coordinate system. In addition, the processor 40 prepares the received data for insertion into the database 42 for later retrieval.

Figure 2:
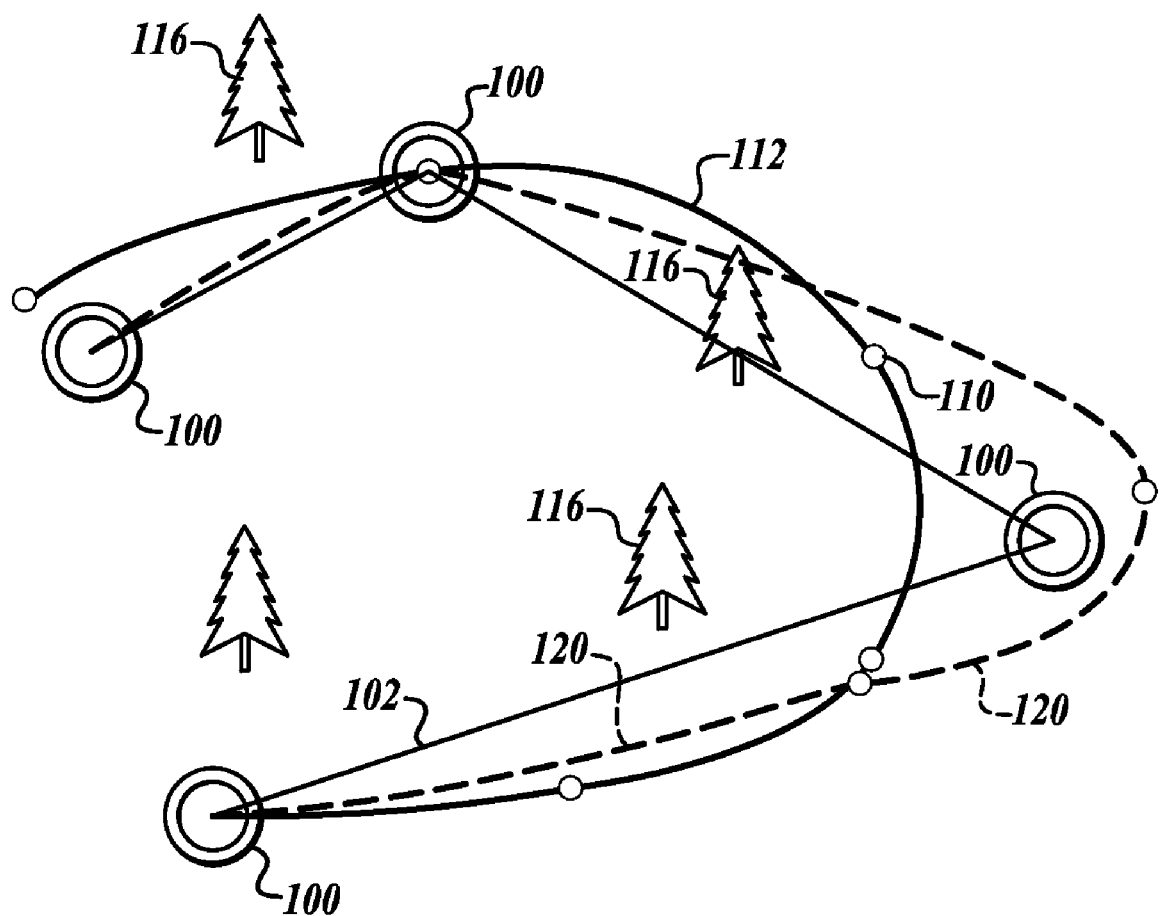
FIG. 2 is a screen shot of a top down view of a vehicle operation scenario displayed according to an embodiment of the present invention.
Figure 3A:
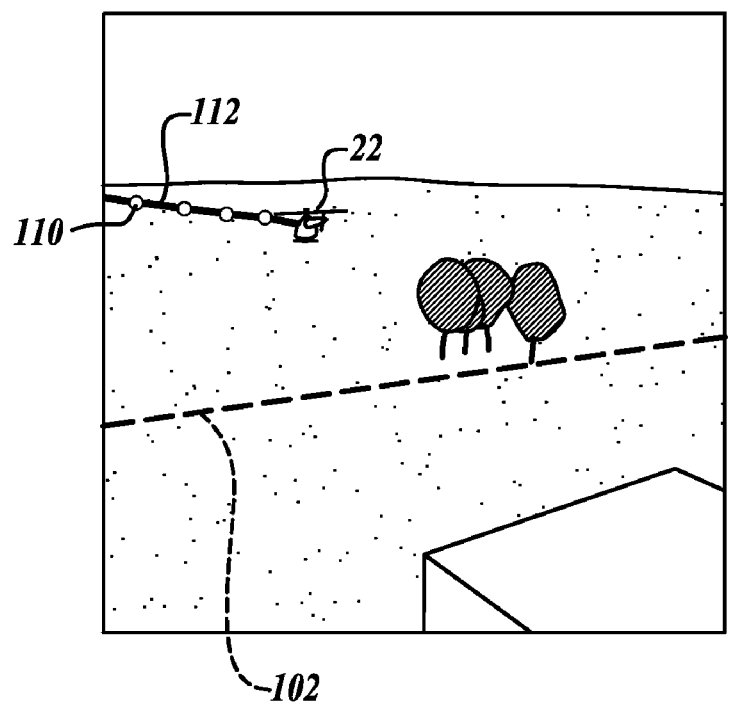
FIGS. 3A and B are screen shots of rendered video images from different viewpoints for a vehicle operation scenario according to an embodiment of the present invention.
Figure 3B:
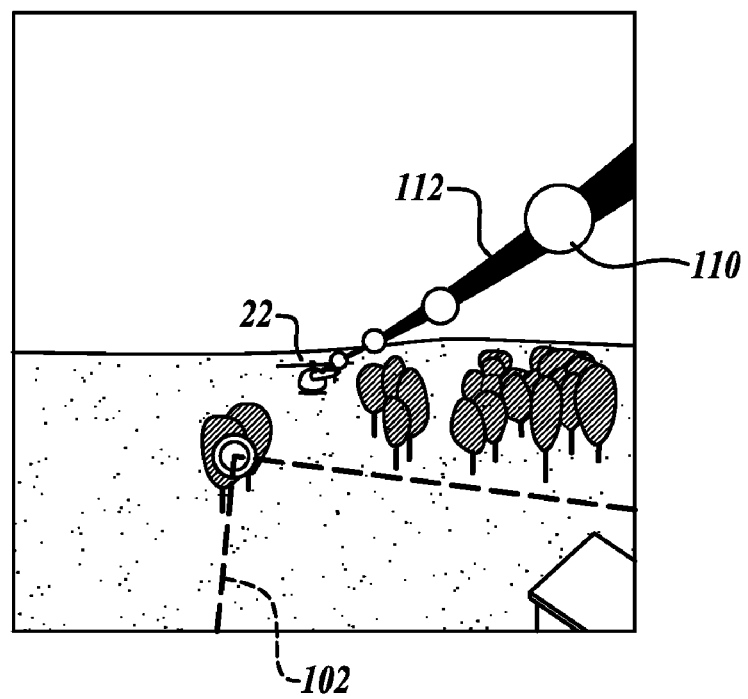

As shown in FIGS. 2, 3A and 3B, the processor 40 presents images that include 3-D waypoint icons 100 that correspond to stored waypoint location information. Also, the processor 40 generates connecting lines 102 that connect successive waypoint icons 100, thus providing a visual indication of the vehicles intended trajectory.

As the vehicle 22 travels in the real environment, the processor 40 generates and displays a series of breadcrumb icons 110 with connecting lines 112 based on the vehicle orientation, position, and velocity information received from the vehicle 22. The breadcrumb icons 110 and connecting lines 112 indicate the vehicle's actual trajectory. The breadcrumb icons 110 are presented at predefined distance or time intervals.

Figure 4:
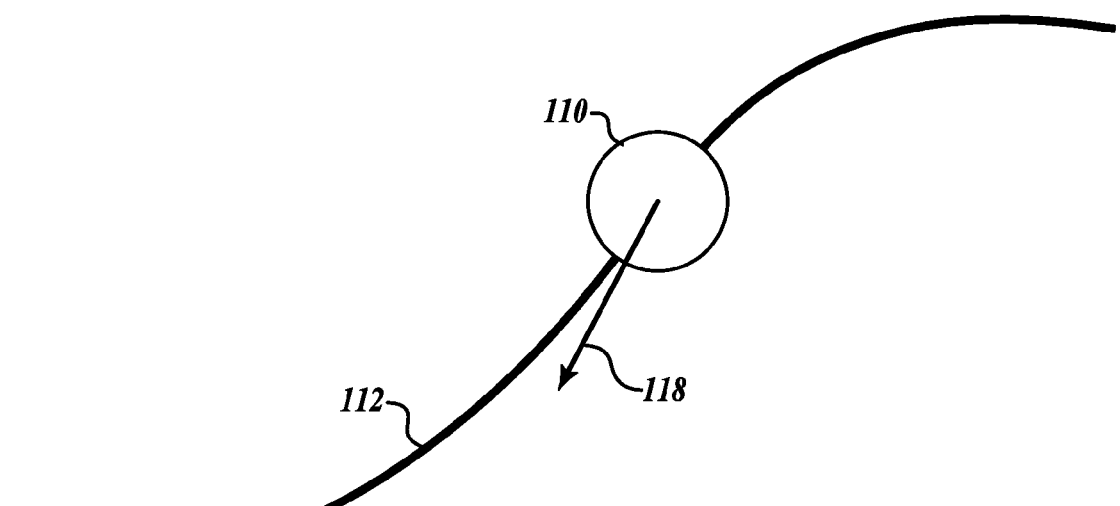
FIG. 4 is a zoomed view of features presented for display according to an embodiment of the present invention.

FIG. 4 illustrates a zoomed-in view of a portion of a displayed breadcrumb icon 110 with connecting lines 112. A vehicle velocity vector icon 118 is also presented with a start point at the center of the breadcrumb icon 110 and pointing in the direction in three-dimensional space that indicates the vehicle's actual velocity vector at that instant in time based on the velocity information received from the vehicle 22.

In another embodiment, terrain and obstacles are generated and displayed in order to more accurately represent the environment in which the vehicle 22 is operating. The terrain and obstacle images presented on the display 44 are generated by the processor 40 based on information stored at either the vehicle database 32 or the base station database 42.

When a user manipulates the user interface 46 in a change viewpoint mode, the processor 40 changes the viewpoint of the image that is presented. Also, multiple viewpoint images may be presented at the same time. For example, as shown in FIGS. 3A and 3B, FIG. 3A shows a viewpoint from the right side of the vehicle 22 and slightly above the horizon from the vehicle 22. FIG. 3B has the viewpoint much closer to the vehicle 22, but behind the vehicle 22.

In one embodiment, vehicle waypoints are programmed in the vehicle 22 in terms of a relative or world coordinate system (i.e. latitude, longitude, and altitude) and sequence. The visually rendered and recorded vehicle trajectories between these waypoints aid in evaluating planned trajectories (lines 102) versus actual vehicle trajectories (lines 112). A calculated trajectory path 120 is generated by the processor 40 to visually represent a calculated vehicle trajectory based on known environmental conditions and vehicle control dynamics. For example, terrain, obstacle and weather information is stored in either or both of the databases 32, 42 and vehicle control dynamics are used by the processor 40 to determine the path 120 based on predefined threshold requirements, such as vertical and horizontal clearances and speed and turning limitations. This improves testing vehicle performance allowing observers to view overshoots and unplanned reactions to environmental conditions. It is also possible to visualize the calculated trajectory path 120 by extracting vehicle control loop responses from vehicle control dynamics (see FIG. 6). This is beneficial when comparing various control loops within the vehicle to determine which algorithm is in control of a vehicle at any given time.

Figure 5:
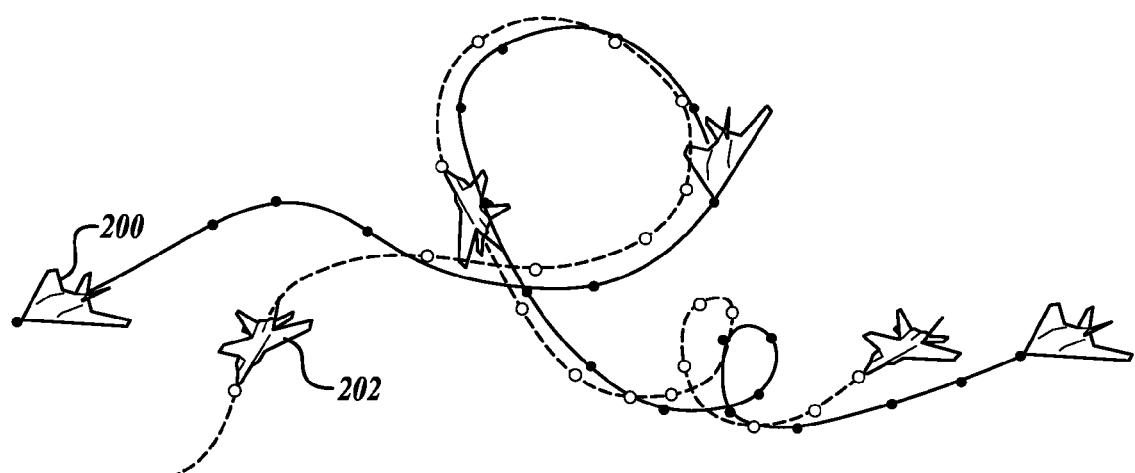
FIG. 5 is a screen shot of a side view of a rendered video image of an air combat scenario according to an embodiment of the present invention.

Referring to FIG. 5, trainers can perform training and after-action review for a trainee on a new vehicle. FIG. 5 shows a visual display of a trainee vehicle 200 after engaging in a dog fight with the trainer/enemy vehicle 202. In the after-action review, the trainers can review and show the trainee where the loss of target occurred and use it to show what actions could have been taken to improve performance in the future.

In one embodiment, the vehicle trajectory information is stored in the vehicle database 32 or the base station database 42. The stored information is transmitted to the base station 24 using either the same remote communications medium or any other acceptable medium. The base station 24 then processes the received data as it would the data received from the vehicle 22 in real-time. The processed data is then displayed by the 3D rendering system.

Figure 6:
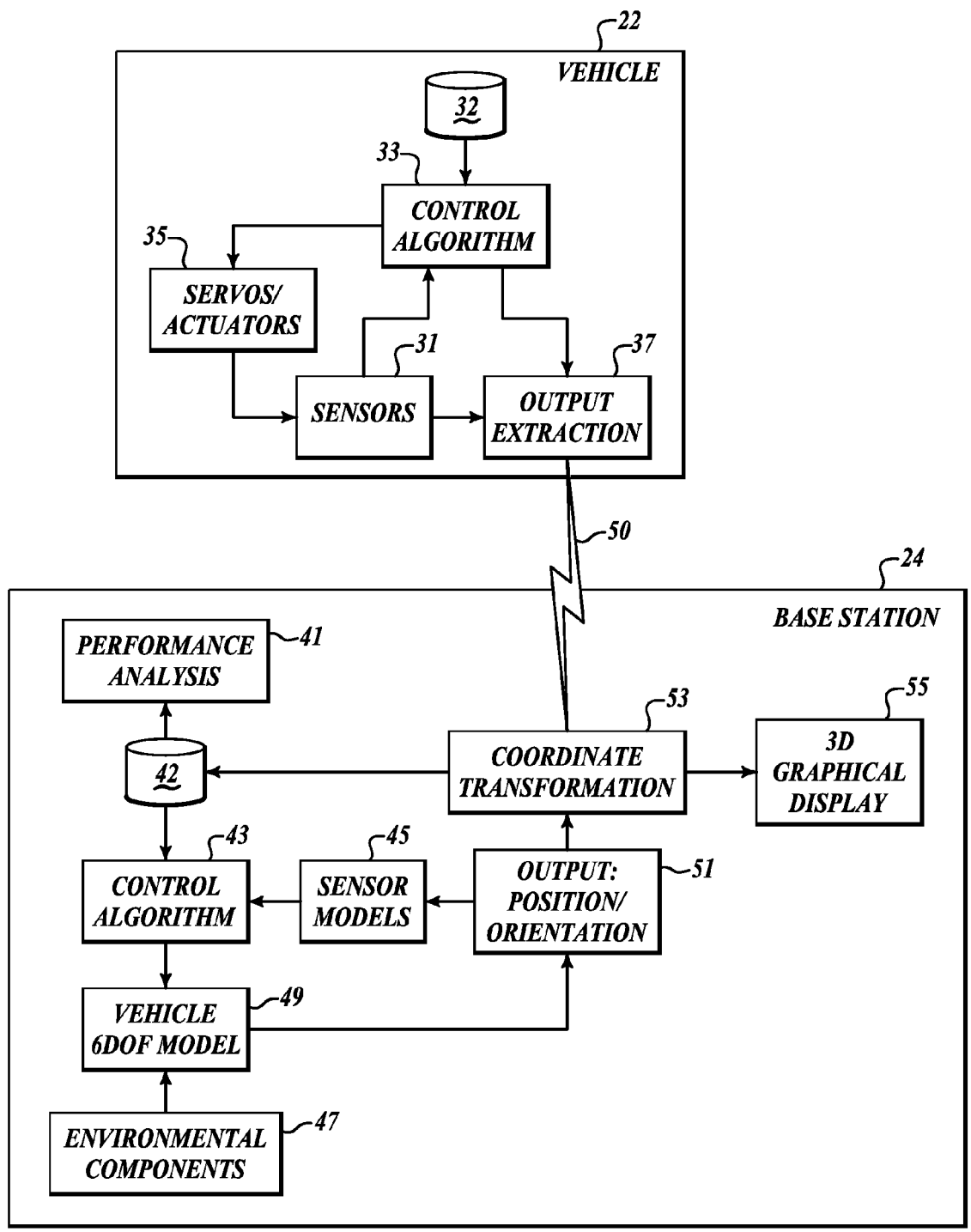
FIG. 6 is a functional representation of the system shown in FIG. 1.

FIG. 6 presents a notional functional representation of the vehicle 22 and the base station 24. The vehicle 22 includes a control loop (a linear feedback system), which includes sensors 31, control algorithms 33, and actuators or servos 35. In certain systems, the vehicle is either unstable enough or there is a collision avoidance system that requires more than one control algorithm 33 to be active. In that case, the control algorithms 33 are combined into a single response or are compared and the best solution is used.

When stating "extracting vehicle control loop responses from vehicle control dynamics," it is with the intent of extracting the commanded position/orientation from the various control algorithms 33 in order to display the various calculated trajectories 120 in the 3D graphical display 55. This is done by the vehicle 22 extracting the various calculated trajectories 120 from the control algorithms 33 and the actual trajectory 112 from the sensor data 31 and preparing the data for output extraction 37 through a wireless connection 50 to the base station 24. On the base station 24, the data is received, coordinate transformations of the received data are performed and the data is logged by the coordinate transformation function 53. Then, the data is displayed in the 3D graphical display 55. This is one instantiation of the calculated trajectory 120.

Another instantiation of the calculated trajectory 120 is also represented in the notional functional design in FIG. 6. The calculated trajectory 120 is displayed in the 3D graphical display 55 after coordinate transformations are performed. The coordinate transformation function 53 performs coordinate transformations of the received data using a resident control loop. The resident control loop generates a dynamic "plant" model of the vehicle using mass and aerodynamic properties (a 6DOF model) 49, sensor models (data) 45, data of waypoints from the database 42, data produced by a control algorithm 43, and data from known or estimated environmental components 47. The data from the environmental components 47 may include wind, air data, etc. There are two potential sources for the environmental components: on board vehicle sensors (ie. wind estimator, air data sensor, etc.) or weather station when on board sensors are not present on the vehicle 22. The telemetry data outputted by the 6DOF model 49 is sent to output 51 then to the coordinate transformation function 53. The coordinate transformation function 53 performs coordinate transformations and sends the data to be logged in the database 42. Then the data is displayed in the 3D graphical display 55.

For both instantiations, the data is logged in the database 42. Performance analysis 41 can be performed on the data post-run or during the actual flight on a separate threaded process, thereby allowing real-time processing and display of the telemetry during the flight of the vehicle 22. Performance analysis allows the comparison of calculated trajectories 120, the planned trajectory (lines 102), and the actual trajectory (lines 112).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A vehicle trajectory visualization system comprising:
   a communication component configured to receive orientation, position, and velocity information from a vehicle;
   a display device; and
   a processor in signal communication with a memory, the communication component, and the display device, the processor configured to generate vehicle trajectory icons based on the received vehicle orientation, position, and velocity information and waypoint icons based on previously defined waypoint information and to calculate a vehicle trajectory based at least on dynamics information associated with the vehicle and environmental conditions of the vehicle;
   wherein the display device displays the calculated vehicle trajectory and the generated icons in a 3D environment based on a predefined viewpoint, wherein the vehicle trajectory icons include one or more nodes and trajectory lines connected to the nodes and the waypoint icons include one or more waypoint nodes with lines that link the waypoint nodes.

2. The system of claim 1, wherein the communication component receives according to a wireless communication protocol.

3. The system of claim 1, wherein the processor performs coordinate system transformation on at least one of the vehicle orientation, position, and velocity information for use in the 3D environment.

4. The system of claim 1, wherein the processor generates one or more velocity vectors associated with at least one of the trajectory icon nodes and the display device displays the generated velocity vectors.

5. The system of claim 1, wherein the memory comprises terrain and obstacle information, the processor generates display features based on the stored terrain and obstacle information, and the display device displays the generated display features.

6. The system of claim 1, wherein the environmental conditions include terrain and obstacle information.

7. The system of claim 1, further comprising a user interface component in signal communication with the processor, the user interface component configured to generate a viewpoint signal, wherein the processor alters viewpoint of the generated icons in the 3D environment based on the generated viewpoint signal.

8. The system of claim 1, wherein the memory stores the vehicle trajectory icons, waypoint icons, and calculated vehicle trajectory as the vehicle travels along a first actual path.

9. A vehicle trajectory visualization method comprising:
receiving orientation, position, and velocity information from a vehicle;
calculating a vehicle trajectory based at least on dynamics information associated with the vehicle and environmental conditions of the vehicle;
generating vehicle trajectory icons based on the received vehicle orientation, position, and velocity information; and
generating waypoint icons based on previously defined waypoint information,
displaying the generated icons and the calculated vehicle trajectory in a 3D environment based on a predefined viewpoint,
wherein the vehicle trajectory icons include one or more nodes and trajectory lines connected to the nodes and the waypoint icons include one or more waypoint nodes with lines that link the waypoint nodes.

10. The method of claim 9, wherein receiving is performed according to a wireless communication protocol.

11. The method of claim 9, wherein generating comprises a coordinate system transformation of at least one of the vehicle orientation, position, and velocity information into the 3D environment.

12. The method of claim 9, wherein generating comprises generating one or more velocity vectors associated with at least one of the trajectory icon nodes and displaying displays the generated velocity vectors.

13. The method of claim 9, wherein generating comprises generating display features based on stored terrain and obstacle information, and displaying displays the generated features.

14. The method of claim 9, wherein the environmental conditions include terrain and obstacle information.

15. The method of claim 9, further comprising generating a viewpoint signal using a user interface device, wherein generating comprises altering a viewpoint of the generated icons in the 3D environment based on the generated viewpoint signal.

16. A vehicle trajectory visualization system, comprising:
a processor in signal communication with at least a first vehicle, wherein the processor calculates a first vehicle trajectory based at least on dynamics information associated with the first vehicle and environmental conditions of the first vehicle, generates vehicle trajectory icons based at least on the received first vehicle orientation and position, and generates velocity information and waypoint icons based at least on previously defined waypoint information; and
a display device that displays the calculated first vehicle trajectory and playback information related to the first vehicle trajectory at least one point during an operation of the first vehicle.

17. The vehicle trajectory visualization system of claim 16, further comprising:
a memory that stores the first playback information;
wherein the display device displays the first playback information at several points during the operation of the first vehicle.

18. The vehicle trajectory visualization system of claim 17, wherein the display device is further configured to display the calculated second vehicle trajectory and playback information related to the second vehicle.

19. The vehicle trajectory visualization system of claim 16, wherein the display device displays the playback information at least during the operation of the vehicle or after the operation of the vehicle.

20. The vehicle trajectory visualization system of claim 16, wherein the processor is in further signal communication with a second vehicle, wherein the processor calculates a second vehicle trajectory based on dynamics information associated with the second vehicle and environmental conditions of the second vehicle and wherein the processor further generates vehicle trajectory icons based on the received second vehicle orientation, position, and velocity information and waypoint icons based on previously defined waypoint information.

* * * * *

UNITED STATES PATENT AND TRADEMARK OFFICE
CERTIFICATE OF CORRECTION

PATENT NO. : 7,912,596 B2
APPLICATION NO. : 11/755363
DATED : March 22, 2011
INVENTOR(S) : Goossen et al.

Page 1 of 1

It is certified that error appears in the above-identified patent and that said Letters Patent is hereby corrected as shown below:

In Claim 16, Column 6, Line 28, Please replace "trajectory at least one" with --trajectory at at least one--

Signed and Sealed this
Twentieth Day of March, 2012

David J. Kappos
*Director of the United States Patent and Trademark Office*